July 16, 1940.  H. J. FEIST  2,208,024
ACCENTUATED VISIBILITY DISPLAY
Filed April 18, 1938  2 Sheets-Sheet 1
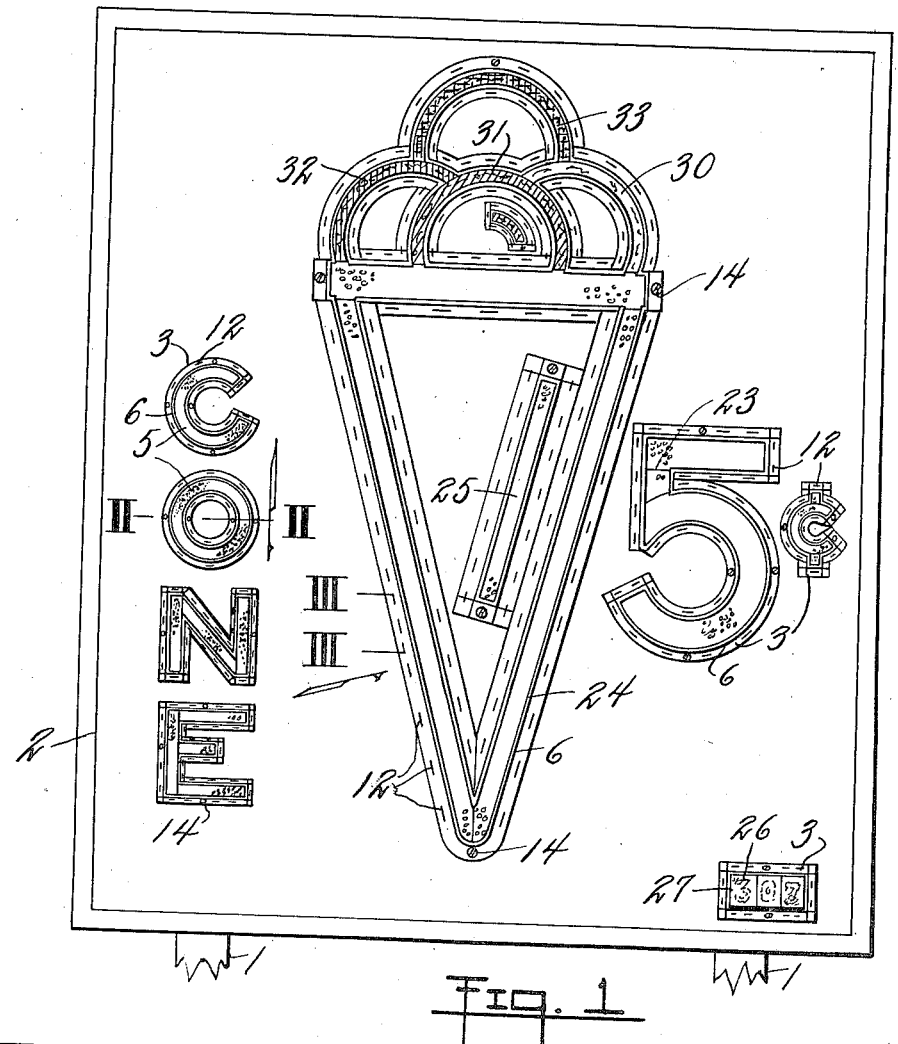
Fig. 1
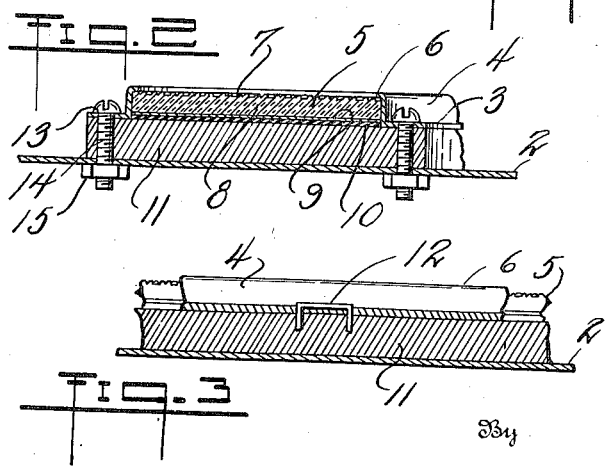
Fig. 2
Fig. 3
Harry J. Feist
Inventor
By
Attorney July 16, 1940.  H. J. FEIST  2,208,024
ACCENTUATED VISIBILITY DISPLAY
Filed April 18, 1938  2 Sheets-Sheet 2
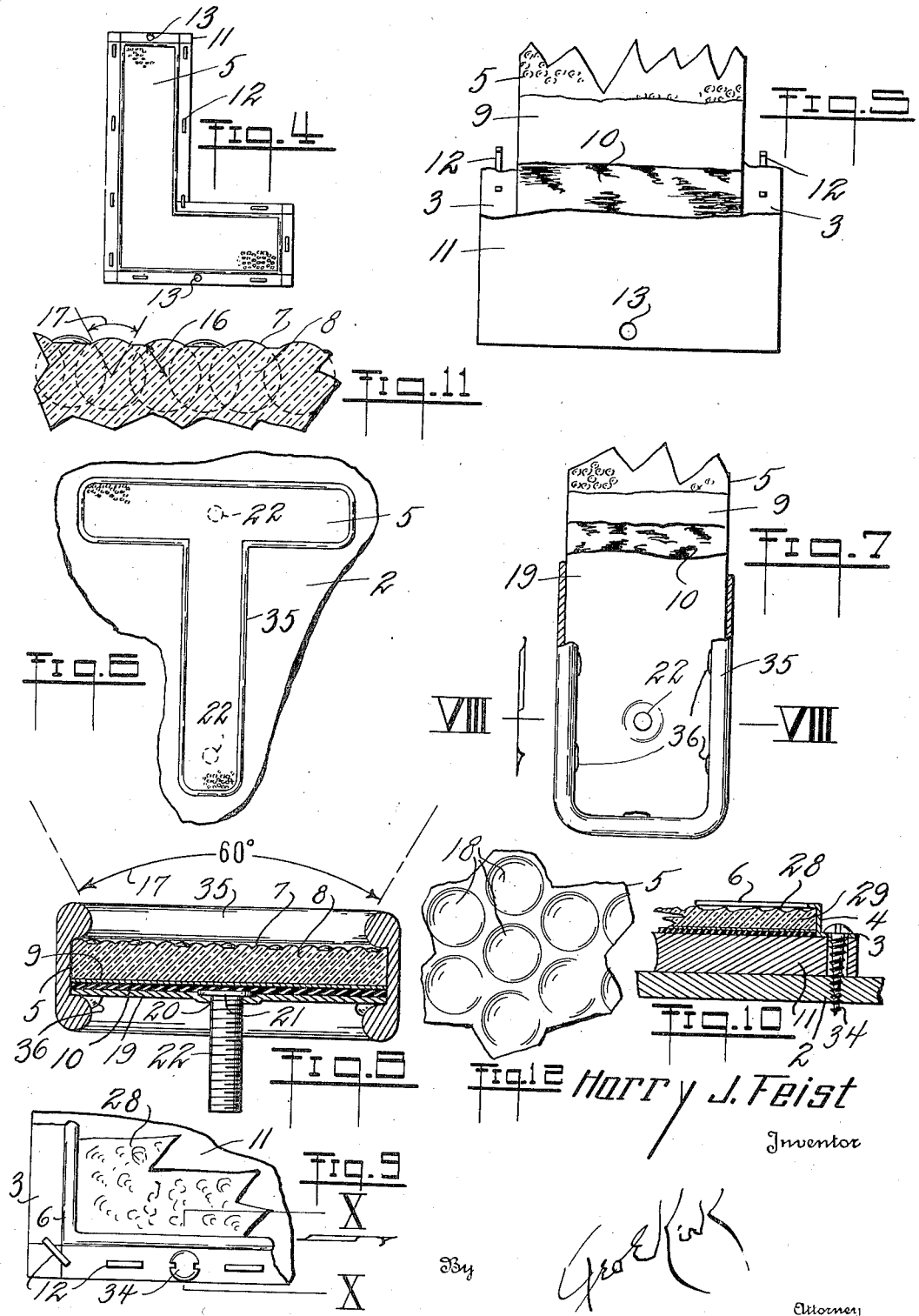

Patented July 16, 1940

2,208,024

UNITED STATES PATENT OFFICE 2,208,024

ACCENTUATED VISIBILITY DISPLAY

Harry J. Feist, Fremont, Ohio, assignor to Consolidated Outdoor Display Company, Fremont, Ohio, a corporation of Ohio Application April 18, 1938, Serial No. 202,659

4 Claims. (Cl. 40—145)

This invention relates to attention-arresting devices as warnings, signs, and displays.

This invention has utility when incorporated in character disclosure or suggestion from distinctive outline and mountings including refractive values therewith, especially from reflection.

Referring to the drawings:

Fig. 1 is a view of an embodiment of the invention in a display sign having the character suggestions therewith;

Fig. 2 is a section on the line II—II, Fig. 1, showing a mounting for a character suggestion;

Fig. 3 is a detail view on the line III—III, Fig. 1, showing assembly of the margin frame with a character suggestion and its back;

Fig. 4 is a detail view of a unit as in one piece for the transparency section;

Fig. 5 is a view from the back, with parts broken away, disclosing features of the make up of a character;

Fig. 6 is a view of a character wherein the marginal framing is direct-assembled with a metal back;

Fig. 7 is a fragmentary detail view from the rear of a portion of the showing of Fig. 6;

Fig. 8 is a section through a character, on the line VIII—VIII, Fig. 7, for its unit mounting and generally of the character of transparency except in the upper portion of Fig. 1;

Fig. 9 is a fragmentary view of a character in which color is important as with a transparency from cathedral glass;

Fig. 10 is a section on the line X—X, Fig. 9, showing the mounting or anchorage therefor;

Fig. 11 is a detail view on an enlarged scale of the general transparency adopted hereunder other than the color, special color being referred to as cathedral, and in which the convex portions are formed by polar zones of spheres, which spheres intersect in the body; and Fig. 12 is a view looking into the transparency of Fig. 11 as having the reflective flat back giving the optical illusion of concavities.

In the instance of general display, especially for exposure along roadside or highway, attributes of value arise for effectiveness in disclosure under variance of conditions throughout the day and night. Distinctive outlining or effective suggestion is inherent in the instance of support 1 mounting base 2 as a general area-providing background. Contrasting color may be disclosed at flange 3 of frame 4 about transparency 5. Assembly hereof is effected by bending over or having flange 6 conform to outer side of the transparency 5 as a binding in effecting snug assembly of this transparency 5 in the frame.

The transparency 5 is herein shown as involving minor spheric zone-providing outer face 7 with intermediate refractive body 8 and rearward therefrom and reflective into the body 8 mirrored portion 9 with protective coating or backing 10 therefor, say a bituminous mass as a waterproofing cushion. Furthermore, especially in instances wherein the transparency be of fragile material as glass, it is helpful not only that the frame 4 be readily conformable and yielding say as of zinc or lead, but that a mounting backer 11 of composition or fibrous material such as fiber board be provided with metal stitching or staples 12 anchoring the frame 4 with such base. As so built up into units, openings 13 therethrough may provide ways for bolts 14 to protrude through general base 2 to be assembled therewith by nuts 15. The general base area 2 may be painted or enameled of a relatively contrasting color from the flange 3 and the outline of the letter or character as a normal indication or disclosure.

In the instance of this transparency or reflective region, herein shown assembled with refractive properties, normal daylight has a range for "live" appearance therefor. However, with exposure to light rays, as from vehicle headlights or projectors, there is a range of this "live" condition of refractive value in reflective operation for as much as 60°. In the instance wherein spheric polar convexities 7 (Fig. 11) have radius 16 of not to exceed one-half the refractive region or body 8 and wherein the adjoining spheric zones are uniform, there approximates an angle 17 of 60° for the spherical zone face. In such a setup the reflective back or mirror 9 produces optical effect of concavities 18 (Fig. 12) in a range up to approximately two hundred and fifty times the radius 16. For greater distance refractive identities tend to merge in the "live" face.

In this general outline for character, in lieu of the fiber mass 11 as a back there may be metal back 19 (Fig. 7), thus reducing the emboss or raise effect on the general base 2. In the instance of the metal back there may be mounting screws or bolts through opening 20. Additional type of assembly for the metal back 19 with the base is by having head 21 of threaded stem 22 anchored with the back 19 and such threaded stem assembled with the main base 2 say by nut.

The transparency or reflective value region may be local to the display portion thereof and made up of strips with joint 23 (Fig. 1) by the respective portions of the transparency.

While primarily there is economy in configuring the reflective, refractive or transparency region to the display even for outline 24 of display (Fig. 1) and even for curvature or third dimension suggestion shading 25 therewith, instances may arise wherein there may be value analogous to that of movable type. Under such circumstances, character 26 (Fig. 1) may have blank 27 or opaque region thereabout and the character assembled in the frame 3 for the desired designation as herein shown for sign numbering in identity for main office check. These numbers may be grouped in the frame 3 according to the requirements and the frame closed therewith. The general assembly is effected by the frame on the back, being water-proof and efficient in its set-up.

In seeking to go further as in the display of color effects, values may be distinctive. Herein there is shown contrasting values in color effects wherein the exposed side need not necessarily be limited to the spheric zones but may approximate unevenness 28 of cathedral glass 29 (Fig. 10). However, there is still retained mirror back 9, reflective into the refractive body of the cathedral glass 29 for dispersion by the irregular face 28. Due to the glass color there is possible colorless glass white region 30 (Fig. 1) in the symbol of the bouquet type of ice cream cone, say for vanilla; while the white effect might also be retained as that from the potash, lime or sode glass of the characters of the words or numbers, as well as the general outline. However, say for chocolate effect, there may be brown or amber body cathedral glass transparency 31; for strawberry or raspberry ice, red cathedral glass 32; and for lemon or orange, yellow cathedral glass 33.

Herein the mirroring or reflective surface or coating is shown only on the irregular or non-planar face. Therefore, such is the range of control and intensity as worked out herein, not only of broader angle but of greater ray value and with solidity of refractive body against detractive characters or dark regions therein under the mirroring of the plane face and the zone ratio as to spheres intersecting in the glass or body. These features as in sections may be assembled, and as occasion for changing the display arises, or other purpose, the base may be retained and say through the opening 13 in such fiber base 11, assembly as detachably effected may be not only by the bolt 14 but by screw 34 (Figs. 9, 10), and such may be of special head as shown for safeguard against casual removal.

In the instance of metal back 19 (Figs. 6, 7, 8), bounding metal frame or channel 35 may have solder 36 as anchorage with the plate 19 toward the flat or smooth back of the transparency.

What is claimed and it is desired to secure by Letters Patent is:

1. A light-ray-reflective configured sign element, a pressure-deformable tight-fitting frame therefor having an overhang coacting about the margin of the element, and having a flange projecting oppositely from the overhang, a base for the frame upon which the flange is positioned, the flange being of continuous extent in bounding relation to the element, and means for holding the element, frame and base as a unit, and mounting means for the unit.

2. A light-ray-reflective sign character, a pressure-deformable tight-fitting frame therefor of general Z-shape in cross-section having one terminal portion of such cross-section forming an overhang for the character and the other terminal portion forming a bounding flange for the character of continuous extent, a base for the frame upon which the flange projects, assembly means between the flange and base for holding the character therewith as a unit, and mounting means for the unit.

3. A light-ray-reflective sign character, a pressure-deformable tight-fitting frame therefor of general Z-shape in cross-section having one terminal portion of such cross-section forming an overhang overlapping the outer margin of the character, a base for the frame and character extending beyond the character and there overlapped by the other terminal portion of the frame, assembly means for the base and frame to hold the character therewith as a unit coacting between the terminal portion overlapping the base and the base, and mounting means for the unit.

4. A light-ray-reflective sign character, a pressure-deformable tight-fitting frame therefor of general Z-shape in cross-section, a base for the character of extent to be overlapped by the frame, a water-proof cushion between the character and base, the portion of the frame overlapping the base forming a continuous bounding means for the character, anchoring means between the overlapping frame portion and said base assembling the character, and mounting means for the unit extending through the overlapping frame portion and the base and projecting therefrom oppositely from the character.

HARRY J. FEIST.